(12) United States Patent
Holloway et al.

(10) Patent No.: US 7,941,646 B2
(45) Date of Patent: May 10, 2011

(54) COMPLETION CONTINUE ON THREAD SWITCH BASED ON INSTRUCTION PROGRESS METRIC MECHANISM FOR A MICROPROCESSOR

(75) Inventors: David C. Holloway, Cedar Park, TX (US); Michael D. Snyder, Cedar Park, TX (US); Suresh Venkumahanti, Austin, TX (US)

(73) Assignee: Freescale Semicondoctor, Inc., Austin, TX (US)

( * ) Notice: Subject to any disclaimer, the term of this patent is extended or adjusted under 35 U.S.C. 154(b) by 645 days.

(21) Appl. No.: 11/967,430

(22) Filed: Dec. 31, 2007

(65) Prior Publication Data

US 2009/0172361 A1  Jul. 2, 2009

(51) Int. Cl.
*G06F 9/00* (2006.01)
(52) U.S. Cl. ..................... 712/220
(58) Field of Classification Search .......... 712/220; 718/108
See application file for complete search history.

(56) References Cited

U.S. PATENT DOCUMENTS

| 6,272,520 B1* | 8/2001 | Sharangpani et al. ........ 718/108 |
| 6,430,674 B1* | 8/2002 | Trivedi et al. .................... 712/43 |
| 6,990,665 B2* | 1/2006 | Ballantyne .................... 718/100 |
| 2002/0002667 A1 | 1/2002 | Kelsey et al. |
| 2005/0149931 A1* | 7/2005 | Lin et al. ........................ 718/100 |

FOREIGN PATENT DOCUMENTS

| EP | 1622003 A1 | 2/2006 |
| WO | 9921083 A1 | 4/1999 |

* cited by examiner

*Primary Examiner* — David J Huisman

(57) ABSTRACT

A thread switch mechanism and technique for a microprocessor is disclosed wherein a processing of a first thread is completed, and a continuation of a second thread is initiated during completion of the first thread. In one form, the technique includes processing a first thread at a pipeline of a processing device, and initiating processing of a second thread at a front end of the pipeline in response to an occurrence of a context switch event. The technique can also include initiating a instruction progress metric in response the context switch event. The technique can further include enabling completion of processing of instructions of the first thread that are at a back end of the pipeline at the occurrence of the context switch event until an expiry of the instruction progress metric.

20 Claims, 3 Drawing Sheets

COMPLETION CONTINUE ON THREAD SWITCH BASED ON INSTRUCTION PROGRESS METRIC MECHANISM FOR A MICROPROCESSOR

FIELD OF THE DISCLOSURE

The present disclosure relates to multithreaded processors and more particularly to thread management for multi-threaded processors.

BACKGROUND

In an event-based multithreading processor, instructions are processed from one program until it is requested, or decides itself, to change to executing another program. When such an event occurs, the processor stops executing the instructions from program A and starts processing of program instructions from program B. In some forms, a simplified method to switch programs can include halt fetching program A instructions, flush an associated data pipeline of the processor, and terminate or kill all instructions of program A which that have not yet been committed. The processor can then start fetching instructions for program B. However, this method of switching programs can lead to execution penalty of a fairly large number of cycles as the processor flushes and starts re-fetching. Additionally, instructions which were completed but not committed (e.g. finalized) would have to be re-fetched and re-processed when program A was resumed, resulting in duplicate execution. This can lead to increased execution times and power dissipation of multithreaded processors.

DETAILED DESCRIPTION

A technique for providing a completion continue on thread switch mechanism for a microprocessor is disclosed. The technique can include a method of processing a first thread at a pipeline of a processing device, and initiating processing of a second thread at a front end of the pipeline in response to an occurrence of a context switch event. The method may also include initiating an instruction progress metric in response the context switch event, and enabling completion of processing of instructions of the first thread that are at a back end of the pipeline at the occurrence of the context switch event until an expiry of the instruction progress metric. In a particular form, the method can include flushing instructions of the first thread from the back end of the pipeline in response to the expiry of the instruction progress metric.

In another form, a processing device including a pipeline having a front end and a back end is disclosed. The front end control logic of the front end may be configured to flush instructions of a first thread from the front end. The front end control logic can further initiate processing of instructions of a second thread at the front end in response to an occurrence of a context switch event. The method can also include an instruction progress metric configured to initiate a flush signal in response to the occurrence of the context switch event.

The processing device can also include a back end control logic of the back end configured to enable completion of processing of instructions of the first thread that are at the back end at the occurrence of the context switch event until an expiry of the instruction progress metric.

Figure 1:
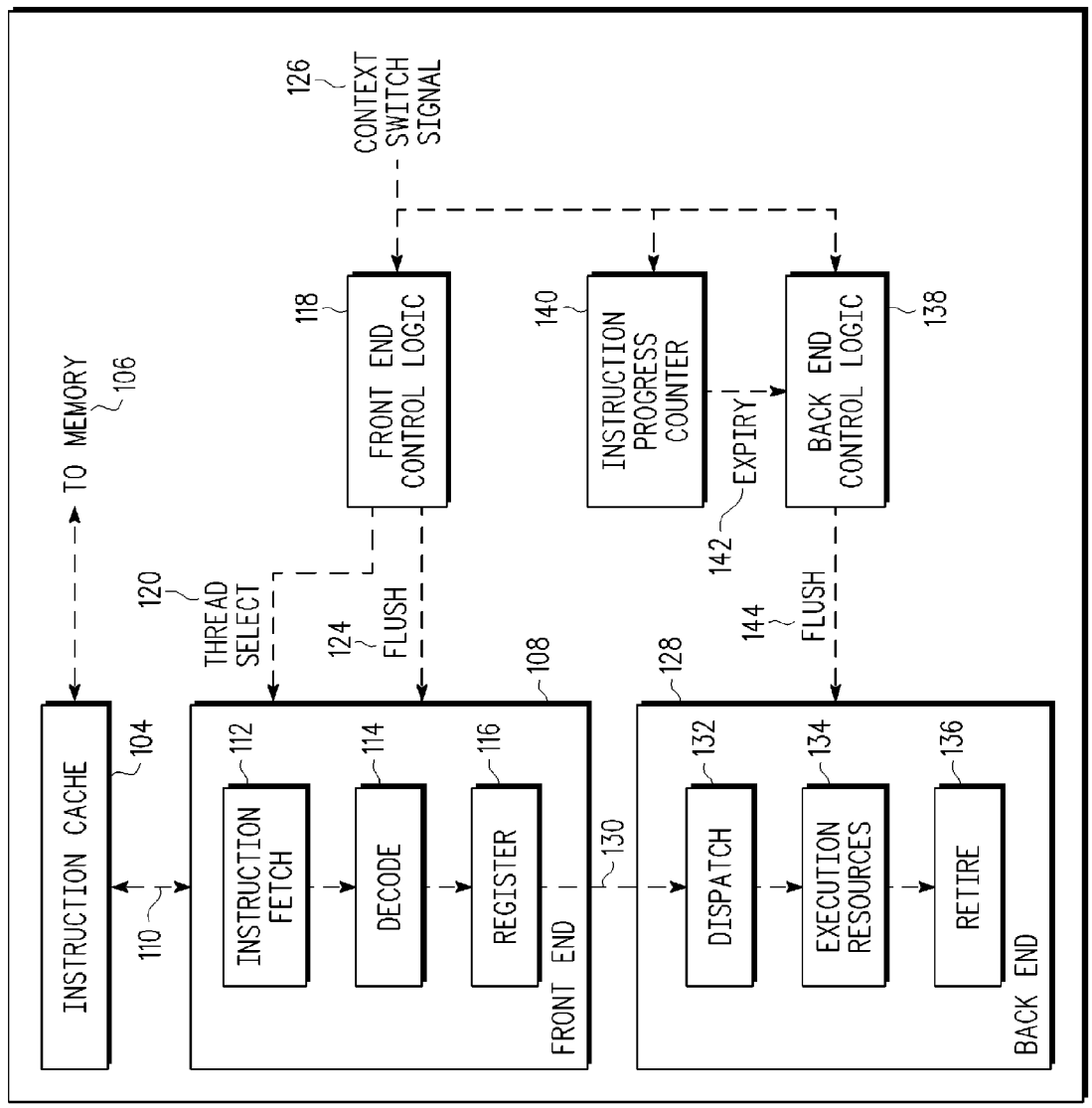
FIG. 1 is a block diagram of a particular embodiment of a data processing system.

Referring to FIG. 1, a block diagram of a particular embodiment of a data processing system 102 including an instruction cache 104 coupled to a memory 106. The instruction cache 104 receives instruction data from the memory 106 storing software programs and routines including instructions for execution. The memory 106 can be volatile memory, such as RAM memory, or non-volatile memory, such as flash memory or a hard disk drive. In a particular embodiment, the memory 106 and the instruction cache 104 are integrated on the same semiconductor substrate as the data processing system 102. In another particular embodiment, the memory 106 is on a separate semiconductor substrate than the data processing system 102 and the instruction cache 104.

The data processing system 102 can be a microprocessor, a microcontroller, an ASIC, and the like. The data processing system 102 is a multithreaded data processing system that is configured to process multiple threads. The threads can be associated with different software programs or routines, can be associated with different tasks of a single software program or routine, or any combination thereof.

In the illustrated embodiment of FIG. 1, the data processing system 102 includes the instruction cache 104 coupled to a front end 108 via an instruction data bus 110. The instruction cache 104 stores instruction data representing instructions of a plurality of threads for execution at the data processing system 102. For example, the data processing system 102 can process multiple threads, with each thread including a series of instructions to process. The data processing system 102 can share resources, but allow for independent execution of instructions for each thread. For example, cached instruction data can be a copy of software program data stored at the memory 106. The front end 108 can further include an instruction fetch module 112 operable to obtain instructions for a thread from the instruction cache 104. The front end 108 further include a decode module 114 operable to decode instructions and a register 116 operable to store or queue instructions. The front end 108 can also be configured to be coupled to a front end control logic 118 operable to output a thread select signal 120 to the front end 108 to select a thread to process. The front end control logic 118 can also be configured to output a flush signal 124 to the front end 108. A flush signal 124 can be used to flush or remove instructions of a specific thread from the front end 108. The front end control logic 118 can further be coupled to a context switch signal 126 operable to initiate a switching between multiple threads from a data processing system within the system 102 (not illustrated).

The front end 108 can also be coupled to a back end 128 and functions as a pipeline that processes multiple threads of the data processing system 102 via an instruction bus 130. The back end 128 can include a dispatch module 132 coupled to the instruction bus 130. The dispatch module 132 can dispatch received instructions from the front end 108 to one or more execution resources 134 of the data processing system 102. The execution resources 134 can be configured to process instructions for one or more thread. The back end 128 further includes a retire module 136 operable to retire instructions. In one form, retirement of instructions and completion of instructions can be viewed as the same.

The data processing system 102 operates as a pipelined processor that breaks up processing threads into stages that perform an instruction fetch, decode, source operand fetch, execution, and writing of destination operands. During a clock signal of the data processing system 102, each stage operates and passes results at the end of the clock signal. As such, during a next clock a next stage will have additional information to process or process. The clock rate for the data processing system 102 is set by the amount of time desired to perform the longest operation.

The back end 128 can further be coupled to a back end control logic 138. The back end control logic can be configured to parallel process with the front end control logic 118. The back end control logic 138 can be coupled to an instruction progress counter 140 operable to output an expiry signal 142. In one form, the instruction progress counter 140 can include a counter set to a specific number of predetermined cycles. In another form, other metrics can be used to initiate an instruction progress counter to a value. For example, metrics can include a number of fetches, a number of memory accesses, a number of instructions processed, a number of uses of a particular execution resource (e.g., uses of an ALU), etc. Such metrics can be used instead of, or in various combinations, to initialize an instruction progress counter operable to be used in association with a flush signal to flush instructions. Other metrics such as one or more timers, memory or cache hits or misses, translation table hits or misses, branch predictions or mis-predictions, performance monitors, or various hardware events, can also be used.

The back end control logic 138 can also be coupled to the context switch signal 126. Using one or more inputs the back end control logic 138 can output a flush signal 144 to the back end 128 to flush the back end 128 of one or more instructions of a specific thread.

During operation, the instruction fetch module 112 can obtain instructions from the instruction cache 104 for a selected thread based on the thread select signal 120 output by the front end control logic 118. The instruction fetch module 112 provides instructions of the selected thread to the decode module 114, and decoded instructions for the selected thread can be stored within the register 116. The dispatch module 132 can store multiple instructions received from the register 116 to be processed using execution resources 134.

As instructions of a first thread are being accessed, the front end control logic 118 can receive the context switch signal 126 to alter or switch from processing of program instructions of the first thread to processing of program instructions of a second thread. The context switch signal 126 can also be coupled to the back end control logic 138 and the instruction progress counter 140. Various types of events can cause a context switch event. For example, a decision branch or conditional branch event processed by a first thread can initiate a thread switch to a second thread. In another form, a program or operating system may request switching from a first thread to a second thread. Various other types of events or occurrences can initiate a thread switch including timeouts, external interrupts, memory or cache hits or misses, translation table hits or misses, branch predictions or mis-predictions, performance monitors, or various hardware events, can also be used. Accordingly, an instruction progress metric for processing of a thread can include, but is not limited to, a cumulative number of cycles of a clock signal during execution of the thread during a period, a cumulative number of instructions of the thread executed during a period, a cumulative number of memory transactions during execution of the thread during a period, a cumulative number of fetches during execution of the thread during a period, a cumulative number of branches during execution of the thread during a period, and the like.

In another form, the front end control logic 118 can output the thread select signal 120 to select a different thread. The front end control logic 118 can also output a flush signal 124 to the front end 108 to flush or remove program instructions of the first thread from the register 116 of the front end 108. The instruction fetch module 112 can initiate obtaining program instructions of a different thread from the instruction cache 104 and the memory 106. At the back end, the back end control logic 138 can receive the context switch signal 126. The instruction progress counter 140 can also receive the context switch signal 126 and can set the instruction progress counter 140 to a value. For example, the instruction progress counter 140 can be set to a value sufficient to enable execution of one or more program instructions of the first thread using the execution resources 134. The instruction progress counter 140 can be altered based on a number of execution or clock cycles of the execution resources 134 or other resources of the data processing system 102. Upon a number of execution cycles occurring, the instruction progress counter 140 can issue an expiry signal 142 to the back end control logic 138. In response to the expiry signal 142, the back end control logic 138 can issue a flush signal 144 to the back end 128 to flush program instructions from the back end 128. In this manner, the front end 108 can initiate or pre-fetch program instructions of a second thread using the front end 108 while maintaining execution of instructions of a first thread using the back end 128, thereby reducing processing time associated with switching between execution of threads within a multiple thread processing device.

Figure 2:
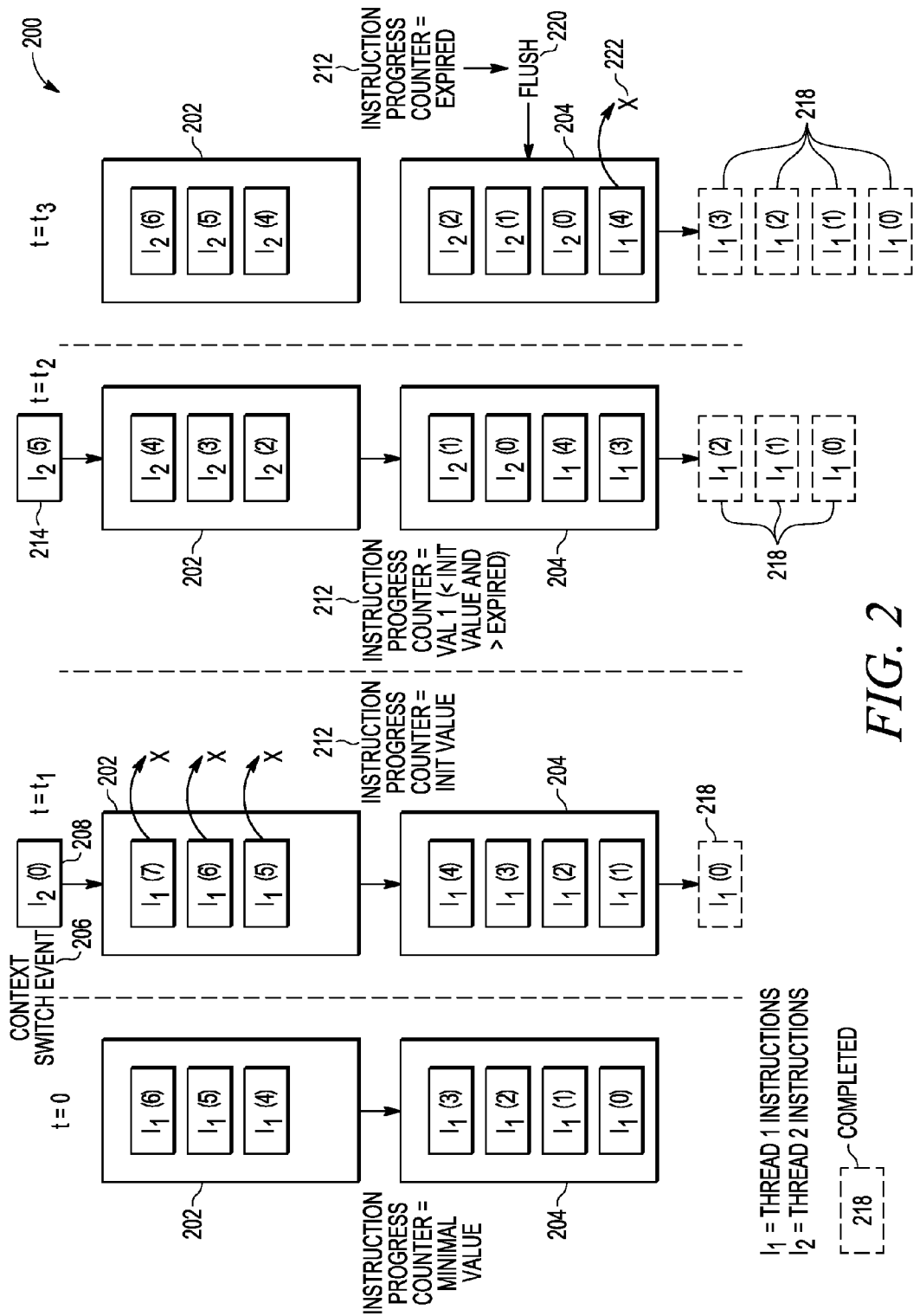
FIG. 2 is a timing diagram of a particular embodiment of a processor of FIG. 1.

FIG. 2 is a timing diagram, illustrated generally at 200, of a particular embodiment of a data processing system of FIG. 1. The timing diagram 200 illustrates processing of instructions of a first thread, referenced as $I_1$, and a second thread, referenced as $I_2$. The $I_1$ and $I_2$ instruction threads are processed using a front end 202 and a back end 204 of an instruction pipeline of a multi-thread processor such as the multi-thread data processing system 102 illustrated in FIG. 1.

At time t=0, an instruction progress counter 212 is set to a minimal value and the front end 202 and the back end 204 are processing a series of instructions of the first thread (instructions $I_1(0)$-$I_1(6)$) within an execution pipeline when a context switch event 206 occurs. The context switch event 206 initiates a switch between executing program instructions of the first thread $I_1$ to executing program instructions of the second thread $I_2$. As such, at time t=$t_1$, a first instruction 208 of a second thread $I_2$ is fetched for processing at the front end 202. Additionally, $I_1$ instructions present within the front end 202 ($I_1(5)$-$I_1(7)$) are flushed or removed from the front end 202. An instruction progress counter can be initiated or set to a value stored within a configuration register in association with flushing $I_1$ instructions from the back end 204 ($I_1(1)$-$I_1(4)$). As such, the back end 204 can continue to process instructions $I_1(1)$-$I_1(4)$. For example, as $I_1(0)$ is a completed instruction 218 resources associated with processing instruction $I_1(0)$ can be released.

At time t=$t_2$, the front end 202 can begin processing of program instructions of the second thread instructions $I_2$ ($I_2(2)$-$I_2(4)$). Additionally, instruction $I_2(5)$ 214 is queued to be processed at the front end 202. Given the instruction progress counter 212 is less than the initiated value, but not yet expired, the back end 204 continues to process $I_1$ instructions ($I_1(3)$-$I_1(4)$) of the first thread $I_1$, and completes $I_1$ instructions 218.

At time t=$t_3$, the front end 202 can process instructions of the second thread instructions $I_2$ ($I_2(4)$-$I_2(6)$). The instruction progress counter 212 expires, and a flush signal 220 is issued to the back end 204 to flush $I_1$ instructions, in this example instruction $I_1(4)$ 222 is flushed or removed from the back end 204. The back end 204 continues to process I$_2$ instructions (I$_2$ (0)-I$_2$ (3)). The front end 202 and back end 204 can continue to process I$_2$ instructions of the second thread until the thread has no more instructions to process or another thread switch event is detected.

Figure 3:
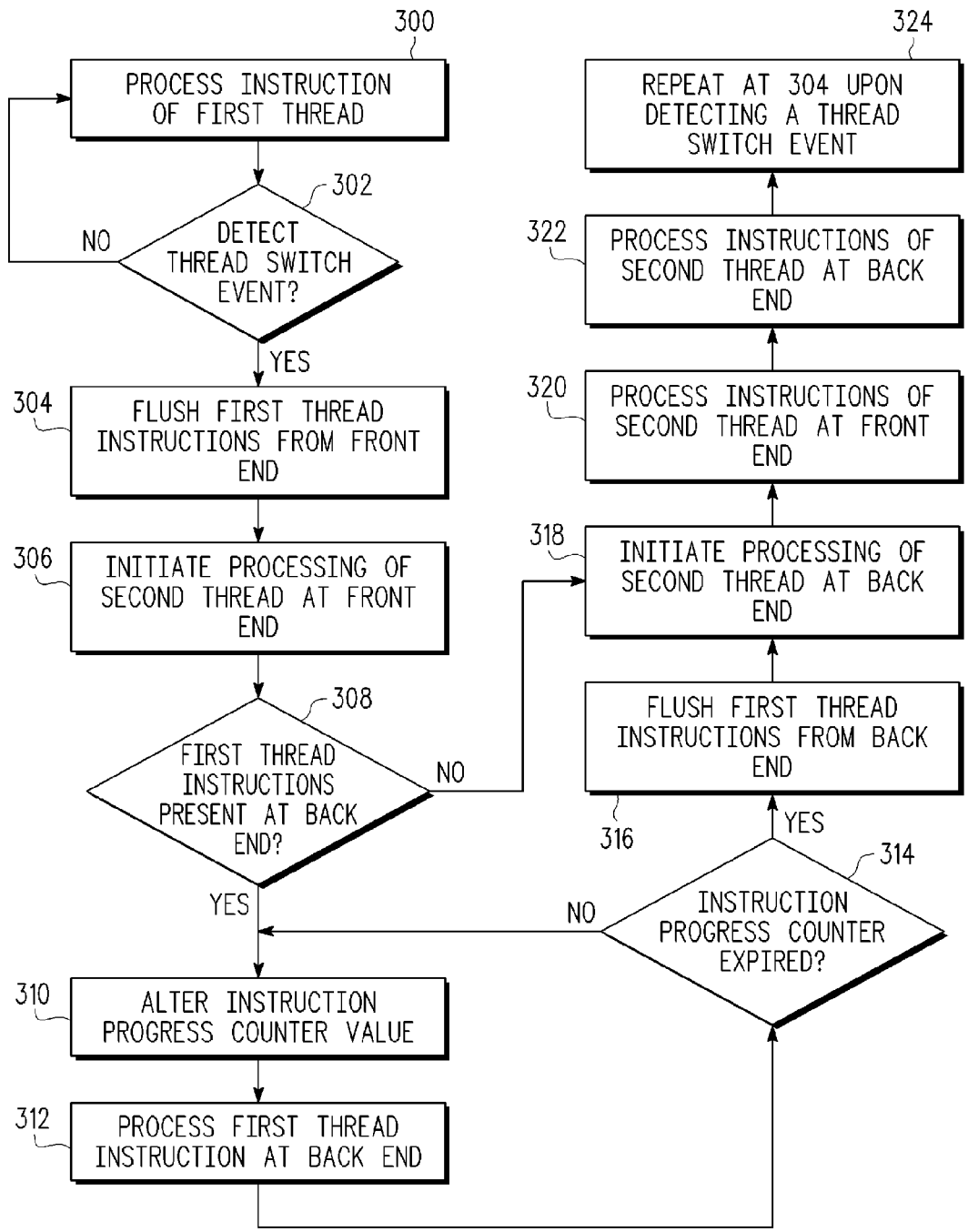
FIG. 3 is a flow diagram of a method of using the data processing system of FIG. 1.

Referring to FIG. 3, a flow diagram of an example of a method of processing data using a data processing device is illustrated. At block 300, a first thread is processed using a processing device such as the processing device illustrated in FIG. 1. At decision block 302, a context switch event is detected and the method can proceed to block 304 and initiates a flush signal, to flush program instructions of the first thread from a front end. Upon initiating an instruction flush, the method can initiate processing the second thread at the front end at block 306. The method can then proceed to decision block 308, and the back end of the pipeline can be accessed to detect whether first thread instructions may be present. If at decision block 308, instructions of the first thread are not be present at the back end, the method can proceed to block 318 as described below.

If at decision block 308, first thread instructions are present at the back end, an instruction progress counter can be altered to a first value at block 310, and at block 312 the back end can process an instruction of the first thread at block 312. In one form, the instruction process counter can be decremented from a maximum value, or another value less than a maximum value. For example, a maximum instruction progress metric value can be detected and altered accordingly. The method can then proceed to decision block 314 and determine whether an expiry of the instruction progress counter may have occurred. For example, if a non-expiry of the instruction progress counter has occurred (e.g. the instruction progress counter has not expired), the method can proceed to block 310 and the instruction progress counter can be altered (e.g. decreased, decremented), and another instruction of the first thread can be processed using the back end of the pipeline.

If at decision block 314, the instruction progress counter has expired, the method can proceed to block 316 and instructions of the first thread can be flushed from the back end of the pipeline. The method can then proceed to block 318, and the back end can initiate processing the second thread at the back end. The method can then proceed to processing of program instructions of the second thread at the front end at block 320, and at block 322 the method can proceed to process instructions of the second thread at the back end. The method can then proceed to block 324 and repeats at 304 upon detecting a thread switch event. For example, the method can detect a thread switch to access a third thread, fourth thread, etc. As such, the method can be modified to enable access to other threads as needed or desired, and is not limited to accessing only a first thread and second thread.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. The term "or" is intended to cover an inclusive "or" such that if both conditions of the "or" conditional are satisfied, then the conditional is satisfied. The term "range" can include a range that includes only a single value.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. For example, although instruction progress counter techniques disclosed herein have been discussed with respect to a single processor, similar techniques could be employed for devices having multiple processor cores. The specification and drawings should be considered exemplary only, and the scope of the disclosure is accordingly intended to be limited only by the following claims and equivalents thereof.

The invention claimed is:

1. A method comprising:
    processing a first thread at a pipeline of a processing device;
    initiating processing of a second thread at a front end of the pipeline in response to an occurrence of a context switch event;
    initiating an instruction progress metric in response to the context switch event;
    enabling completion of processing of instructions of the first thread that are at a back end of the pipeline at the occurrence of the context switch event until an expiry of the instruction progress metric; and
    flushing instructions of the first thread from the back end of the pipeline in response to the expiry of the instruction progress metric.

2. The method of claim 1, further comprising flushing instructions of the first thread that are at the front end of the pipeline in response to the occurrence of the context switch event.

3. The method of claim 2, further comprising:
    processing instructions of the second thread at the front end upon flushing instructions of the first thread at the front end; and
    initiating processing instructions of the second thread at the back end in response to detecting completion of the processing of instructions of the first thread at the back end.

4. The method of claim 1 wherein the instruction progress metric is based on at least one criterion selected from the group consisting of: a number of fetches, a number of memory accesses, a number of instructions processed, and a number of uses of an execution resource.

5. The method of claim 1, further comprising:
    detecting processing of instructions of the second thread at the front end; and
    initiating the instruction progress metric to a second instruction progress metric value upon detecting a second thread switch event.

6. The method of claim 5, further comprising:
detecting processing of instructions of the second thread at the back end; and
decrementing the instruction progress metric in response to detecting a second thread switch event and further in response to processing the instructions of the second thread at the back end after detecting the second thread switch event.

7. The method of claim 6, further comprising:
detecting completion of processing of instructions of the second thread at the front end;
detecting an expiry of the instruction progress metric; and
initiating a flushing of the instructions of the second thread at the back end in response to the expiry.

8. The method of claim 1, further comprising:
detecting a non-expiry of the instruction progress metric;
maintaining processing of the instructions of the first thread at the back end; and
processing instructions of the second thread at the front end.

9. The method of claim 3, further comprising:
detecting an increase in a number of instructions of the second thread at the back end;
detecting whether the instruction progress metric is at a maximum instruction progress metric value; and
incrementing the instruction progress metric in response to the instruction progress metric being less than the maximum instruction progress metric value.

10. A processing device comprising:
a pipeline comprising a front end and a back end;
front end control logic of the front end configured to flush instructions of a first thread from the front end and to initiate processing of instructions of a second thread at the front end in response to an occurrence of a context switch event;
an instruction progress metric configured to initiate a flush signal in response to the occurrence of the context switch event; and
back end control logic of the back end configured to enable completion of processing of instructions of the first thread that are at the back end at the occurrence of the context switch event and to flush instructions of the first thread from the back end in response to an expiry of the instruction progress metric.

11. The processing device of claim 10, wherein the back end control logic is further configured to flush instructions of the first thread from the front end in response to the occurrence of the context switch event.

12. The processing device of claim 11, wherein the pipeline is further configured to initiate executing the instructions of the second thread at the front end while maintaining execution of the instructions of the first thread at the back end.

13. The processing device of claim 11, further comprising a maximum instruction progress metric value configured to be used with the instruction progress metric.

14. The processing device of claim 10, wherein the instruction progress metric is configured to be decremented upon loading an instruction of the first thread into the back end.

15. The processing device of claim 14, further comprising:
wherein the instruction progress metric is further configured to be initiated in response to a detection of the context switch event; and
wherein the instruction progress metric is further configured to be decremented using a clock signal associated with completion of a program of instructions of the second thread.

16. The processing device of claim 10, wherein the instruction progress metric is further configured to be altered from a first value associated with a first number of instructions of a first program to a second value associated with a second number of instructions of a second program.

17. The processing device of claim 10, wherein:
the front end control logic is further configured to enable processing of instructions of the second thread at the front end during processing of instructions at the first thread at the back end; and
the back end control logic is further configured to enable processing of instructions of the second thread at the back end upon completion of processing instructions of the first thread.

18. A method comprising:
processing a first thread at a pipeline of a processing device based on instructions from an instruction cache;
initiating processing of a second thread at a front end of the pipeline in response to an occurrence of a context switch event;
initiating an instruction progress metric in response to the context switch event, the instruction progress metric based on a counter value;
enabling completion of processing of instructions of the first thread that are at a back end of the pipeline at the occurrence of the context switch event until an expiry of the instruction progress metric; and
flushing instructions of the first thread from the back end of the pipeline in response to the expiry of the instruction progress metric.

19. The method of claim 18, further comprising:
processing instructions of the second thread at the front end during flushing of the instructions of the first thread;
detecting completion of the processing of instructions of the first thread at the back end; and
initiating processing instructions of the second thread at the back end.

20. The method of claim 18, further comprising:
detecting a non-expiry of the instruction progress metric;
maintaining processing of the instructions of the first thread at the back end; and
processing instructions of the second thread at the front end.

* * * * *